US012606733B2

(12) United States Patent
Gizzatov et al.

(10) Patent No.: US 12,606,733 B2
(45) Date of Patent: Apr. 21, 2026

(54) SULFONATION METHOD FOR EFFICIENT SCALEUP SYNTHESIS OF JANUS CARBON NANOFLUIDS FROM WASTE PLASTICS

(71) Applicant: ARAMCO SERVICES COMPANY, Houston, TX (US)

(72) Inventors: Ayrat Gizzatov, Winchester, MA (US); Wei Wang, Quincy, MA (US); Sehoon Chang, Boston, MA (US)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 91 days.

(21) Appl. No.: 18/605,530

(22) Filed: Mar. 14, 2024

(65) Prior Publication Data

US 2025/0289991 A1 Sep. 18, 2025

(51) Int. Cl.
*C09K 8/58* (2006.01)
*E21B 43/16* (2006.01)

(52) U.S. Cl.
CPC ................ *C09K 8/58* (2013.01); *E21B 43/16* (2013.01); *C09K 2208/10* (2013.01)

(58) Field of Classification Search
CPC ...................................................... C09K 8/58
See application file for complete search history.

(56) References Cited

U.S. PATENT DOCUMENTS

| | | |
|---|---|---|
| 7,662,747 B2 | 2/2010 | De Ruiter |
| 2014/0263771 A1* | 9/2014 | Kerns ........................ B07C 5/00 |
| | | 241/24.31 |

| | | | |
|---|---|---|---|
| 2015/0021525 A1 | 1/2015 | Naskar et al. | |
| 2015/0218921 A1 | 8/2015 | Suresh et al. | |
| 2017/0240792 A1 | 8/2017 | Monclin et al. | |
| 2018/0320049 A1 | 11/2018 | Shumway et al. | |
| 2018/0346798 A1 | 12/2018 | Abdel-Fattah et al. | |
| 2019/0198862 A1 | 6/2019 | Campbell et al. | |
| 2019/0276315 A1* | 9/2019 | Mohanty ................. C10B 57/06 |
| 2020/0056086 A1* | 2/2020 | Haq .......................... B01J 20/20 |

(Continued)

FOREIGN PATENT DOCUMENTS

| | | |
|---|---|---|
| CN | 101670299 B | 1/2012 |
| CN | 103332687 A | 10/2013 |

(Continued)

OTHER PUBLICATIONS

International Search Report issued in corresponding International Application No. PCT/US2025/019729; mailed Jun. 6, 2025 (5 pages).

(Continued)

*Primary Examiner* — William D Hutton, Jr.
*Assistant Examiner* — Avi T Skaist
(74) *Attorney, Agent, or Firm* — Osha Bergman Watanabe & Burton LLP

(57) ABSTRACT

A method of preparing an enhanced oil recovery composition is described. The method includes carbonizing a waste plastic material to provide carbon microparticles, functionalizing the carbon microparticles with a $SO_3$-containing gas such that the carbon microparticles have a hydrophilic surface, and grinding the carbon microparticles to provide carbon nanoparticles. The carbon nanoparticles have a hydrophilic surface and a hydrophobic surface. A method of enhanced oil recovery is also described.

16 Claims, 4 Drawing Sheets

100

102
Carbonize waste plastic material to provide carbon microparticles

104
Functionalize carbon microparticles with $SO_3$ gas

106
Grind carbon microparticles to provide carbon nanoparticles

(56)            References Cited

U.S. PATENT DOCUMENTS

| | | | |
|---|---|---|---|
| 2020/0290879 | A1 | 9/2020 | Chang et al. |
| 2021/0023533 | A1 | 1/2021 | Awadh et al. |
| 2022/0025248 | A1 | 1/2022 | Wang et al. |
| 2024/0166939 | A1 | 5/2024 | Wang et al. |

FOREIGN PATENT DOCUMENTS

| | | | |
|---|---|---|---|
| CN | 104098083 | A | 10/2014 |
| CN | 104650864 | A | 5/2015 |
| CN | 105439123 | A | 3/2016 |
| CN | 107892291 | A | 4/2018 |
| CN | 108342213 | A | 7/2018 |
| CN | 108940192 | A | 12/2018 |
| CN | 108946721 | A | 12/2018 |
| CN | 108993393 | A | 12/2018 |
| CN | 110105941 | A | 8/2019 |
| CN | 110872498 | B | 11/2021 |
| CN | 113773815 | A | 12/2021 |
| CN | 114259984 | A | 4/2022 |
| CN | 115924886 | A | 4/2023 |
| DE | 102016101215 | A1 | 6/2017 |
| EP | 2451744 | B1 | 5/2012 |
| GB | 1406378 | A | 9/1975 |
| TW | i537208 | B | 6/2016 |
| WO | 2004073094 | A1 | 8/2004 |
| WO | 2007093725 | A2 | 8/2007 |
| WO | 201411460 | A1 | 1/2014 |
| WO | 2014011457 | A1 | 1/2014 |
| WO | 2014011462 | A1 | 1/2014 |
| WO | 2016064718 | A1 | 4/2016 |
| WO | 2023018544 | A1 | 2/2023 |
| WO | 2025042599 | A1 | 2/2025 |

OTHER PUBLICATIONS

Written Opinion of the International Searching Authority issued in corresponding International Application No. PCT/US2025/019729; Jun. 6, 2025 (7 pages).

K. Song, "Application of Biomass Derived Materials in Nanocomposites and Drilling Fluids", LSU Doctoral Dissertations. Published Aug. 2016 , (145 pages).

J. Liu et al., "Carbon Dots: A New Type of Carbon-Based Nanomaterial with Wide Applications", ACS Cent. Sci. 2020, vol. 6, pp. 2179-2195 (17 pages).

Y. Wu et al., "In-situ synthesis of high thermal stability and salt resistance carbon dots for injection pressure reduction and enhanced oil recovery", Nano Research, Dec. 5, 2022, pp. 1-8 (8 pages).

Gao, Jie, et al., "Degradation of Trichloroethene with a Novel Ball Milled Fe—C Nanocomposite", Journal of Hazardous Materials, ScienceDirect, Elsevier B.V., vol. 300, 2015, pp. 443-450 (8 pages).

Gong, Jiang, et al., "Recent progress in controlled carbonization of (waste) polymers", Progress in Polymer Science, 2019 (79 pages).

Hu, Yaoping, et al., "Green and size-controllable synthesis of photoluminescent carbon nanoparticles from waste plastic bags", RSC Advances, Royal Society of Chemistry, vol. 4, 2014, pP. 47169-47176 (8 pages).

Li, Yuyang, et al., "A novel nanofluid based on fluorescent carbon nanoparticles for enhanced oil recovery", Industrial & Engineering Chemistry Research, ACS Publications, Oct. 2017 (23 pages).

Yoshioka, Toshiaki, et al., "Hydrolysis of Waste PET by Sulfuric Acid at 150° C for a Chemical Recycling", Journal of Applied Polymer Science, John Wiley & Sons, Inc., vol. 52, 1994, pp. 1353-1355 (3 pages).

Non-Final Office Action issued in corresponding U.S. Appl. No. 18/056,993, mailed Apr. 29, 2024 (12 pages).

Abd Hamid, Sharifah Bee et al., "Green Catalytic Approach for the Synthesis of Functionalized Nanocellulose from Palm Tree Biomass"; Advanced Materials Research; vol. 925; pp. 57-61; Apr. 2014 (5 pages).

Sankar, S. et al., "Biomass-derived ultrathin mesoporous graphitic carbon nanoflakes as stable electrode material for high-performance supercapacitors"; Materials & Design; vol. 169, Article 107688; pp. 1-9; May 5, 2019 (9 pages).

Chai, Y H et al., "Comparison of rheological properties of graphene / carbon nanotube hydrogenated oil based biodegradable drilling fluid"; IOP Conference Series: Materials Science and Engineering; vol. 206, Article 012042, 29th Symposium of Malaysian Chemical Engineers (SOMChE) 2016; pp. 1-9; 2017 (9 pages).

Mahat, Nur Akma et al., "Transformation of oil palm biomass to optical carbon quantum dots by carbonisation-activation and low temperature hydrothermal processes"; Diamond and Related Materials; vol. 102, Article 107660; Feb. 2020 (28 pages).

Kang, Chao et al., "A Review of Carbon Dots Produced from Biomass Wastes"; Nanomaterials; vol. 10, Issue 11, Article 2316; pp. 1-24; Nov. 2020 (24 pages).

Chausali, Neha et al., "Nanobiochar and biochar based noncomposites: Advances and applications"; Journal of Agriculture and Food Research; vol. 5, Article 100191; pp. 1-12; Sep. 2021 (12 pages).

Liu, Zhixin et al., "Modified biochar: synthesis and mechanism for removal of environmental heavy metals"; Carbon Research; vol. 1, Issue 1, Article 8; pp. 1-21; Dec. 2022 (21 pages).

Non-Final Office Action issued in corresponding U.S. Appl. No. 18/056,993, mailed Sep. 19, 2023 (15 pages).

Final Office Action issued in corresponding U.S. Appl. No. 18/056,993, mailed Dec. 28, 2023 (10 pages).

International Search Report and Written Opinion issued in Application No. PCT/US2025/019746, mailed on Jun. 6, 2025 (16 pages).

International Search Report issued for corresponding international patent application No. PCT/US2025/019739, mailed May 27, 2025 (6 pages).

Written Opinion issued for corresponding international patent application No. PCT/US2025/019739, mailed May 27, 2025 (10 pages).

Valentina G. Matveeva et al., "From renewable biomass to nanomaterials: Does biomass origin matter?" Progress in Materials Science, Jun. 28, 2022, vol. 130, 100999 (41 pages).

International Search Report and Written Opinion issued in corresponding International Application No. PCT/US2024/041631, dated Nov. 25, 2024 (15 pages).

* cited by examiner

100

102 — Carbonize waste plastic material to provide carbon microparticles

104 — Functionalize carbon microparticles with $SO_3$ gas

106 — Grind carbon microparticles to provide carbon nanoparticles

300 ⌐

302 ⌐
| Introduce EOR fluid into hydrocarbon-bearing formation |

304 ⌐
| Displace hydrocarbons from hydrocarbon-bearing formation |

306 ⌐
| Recover hydrocarbons |

SULFONATION METHOD FOR EFFICIENT SCALEUP SYNTHESIS OF JANUS CARBON NANOFLUIDS FROM WASTE PLASTICS

BACKGROUND

Among the major challenges in the modern world, meeting energy needs and protecting the environment are two of the top ranked. In addressing our ever-growing energy needs, conventional fossil fuels are still the primary energy source; however, they are becoming harder to extract from mature fields. Recent developments in petroleum engineering research have shown that nanomaterials may be used in oil flooding techniques, often referred to as nanofluid flooding, to improve oil displacement. One advantage of nanofluids arises from the small size of the included nanomaterials, that are able to alter the wettability of the reservoir rocks and/or change interfacial tension (IFT) at water-oil interface to increase oil recovery. However, various constraints influence the fluid-fluid and fluid-rock interactions of current nanofluids and subsequent oil recovery.

Likewise, whereas environmental protection is a longstanding goal, plastics, one of the most widely used materials in the modern world, are highly durable and difficult to degrade. Thus, the development of efficient strategies for the recycling of plastic materials has become a major goal across industries.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a method of preparing an enhanced oil recovery composition. The method includes carbonizing a waste plastic material to provide carbon microparticles, functionalizing the carbon microparticles with a $SO_3$-containing gas such that the carbon microparticles comprise a hydrophilic surface, and grinding the carbon microparticles to provide carbon nanoparticles. The carbon nanoparticles comprise a hydrophilic surface and a hydrophobic surface.

In another aspect, embodiments disclosed herein relate to a method of enhanced oil recovery. The method includes introducing the enhanced oil recovery composition containing carbon microparticles with a hydrophilic surface and a hydrophobic surface into a hydrocarbon-bearing formation, displacing hydrocarbons from the hydrocarbon-bearing formation, and recovering the hydrocarbons.

Other aspects and advantages of the claimed subject matter will be apparent from the following description and the appended claims.

DETAILED DESCRIPTION

Recent developments in enhanced oil recovery (EOR) techniques have demonstrated the effective use of nanotechnology in EOR fluids to improve oil recovery. Generally, nanomaterials included in EOR fluid can resist high temperature and pressure in subsurface oil reservoir system and exhibit different surface properties compared to organic molecules in porous media such as reservoir rocks, providing access to oil that is unreachable by surfactants and polymers conventionally used in EOR processes. Based on the specific physical characteristics and properties of a given nanomaterial, additional benefits of using such technology may include the ability to alter the wettability of minerals, decrease the interfacial tension (IFT) at the oil-water interface, change the viscosity of fluids, and/or generate structural disjoining pressure at the oil/rock interface. Specifically, Janus nanomaterials whose surfaces have two or more distinct chemical or physical properties, hold dual nanoparticle and surfactant-like properties. Accordingly, the development of economical and sustainable methods to produce field quantities of low-cost nanomaterials would be very beneficial.

Plastics, ubiquitous in modern society, are made of a wide range of synthetic polymeric materials that often degrade very slowly. Since most of the polymers are formed from chains largely containing carbon atoms, this makes them excellent precursors for carbon materials, such as, for example, carbon nanoparticles. As EOR nanofluids may exhibit improved oil recovery compared to conventional fluids, carbon nanoparticles derived from waste plastic materials may be used in compositions and methods for EOR. Such compositions and methods would help address two major challenges in the modern world, namely, increasing energy needs and environmental protection. Accordingly, the present invention relates to a method of preparing carbon nanoparticles from waste plastic materials, as well as a composition and method of EOR using such carbon nanoparticles.

Method of Preparing Janus Carbon Nanoparticles

In one aspect, embodiments disclosed herein relate to a method of preparing carbon nanoparticles for use in an EOR composition. In particular, the carbon nanoparticles may be prepared from a waste plastic material, and as such, the method may double as a method for recycling waste plastic. The method may include carbonizing the waste plastic material to form carbon microparticles, functionalizing the carbon microparticles, and grinding the carbon microparticles to provide Janus carbon nanoparticles with asymmetric surface properties.

Figure 1:
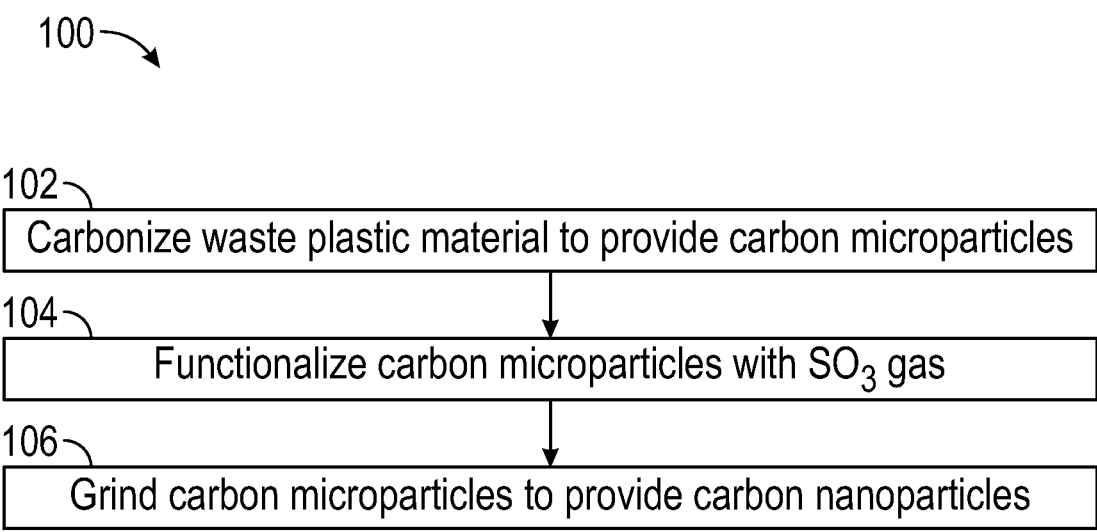
FIG. 1 is a block-flow diagram of a method in accordance with one or more embodiments of the present disclosure.

A method 100 of preparing carbon nanoparticles in accordance with the present disclosure is shown in, and discussed with reference to, FIG. 1. Initially, in method 100, waste plastic material is carbonized through a pyrolytic process 102. As used herein, "carbonize" refers to a process in which a carbon-containing material, such as the aforementioned waste plastics, is converted or "carbonized" to a material at high temperature under inert atmosphere, or a material that is largely composed of amorphous carbon. Thus, the waste plastic material may be any waste plastic material that contains carbon, such as, for example, in hydrocarbons or aromatic rings. Suitable waste plastic materials that may be carbonized include polymers such as polypropylene (PP), polystyrene (PS), acrylonitrile butadiene styrene (ABS), polyethylene terephthalate (PET), polyester (PES), polyamide (PA), polyvinyl chloride (PVC), polyurethane (PU), polycarbonate (PC), polyvinylidene chloride (PVDC), polyethylene (PE), and combinations thereof. In some embodiments, the waste plastic material includes PET, PP, PVC, PS, high-density polyethylene (HDPE), or low-density polyethylene (LDPE). The waste plastic material may be a post-consumer waste plastic material such as, for example, a plastic water bottle.

In one or more embodiments, prior to being carbonized, the waste plastic material is processed to provide plastic fragments by cutting or grinding the waste plastic material. The waste plastic material may be processed into plastic fragments having a suitable size. For example, in one or more embodiments, plastic fragments have a suitable size ranging from millimeter to submillimeter sizes, for example, 1×1×1 mm, or 0.5×0.5×5 mm, etc.

Carbonization of the waste plastic material may be carried out according to any method known in the art. In one or more embodiments, the waste plastic material is carbonized by heating to an elevated temperature for a sufficient amount of time in inert atmosphere such as nitrogen ($N_2$) or argon (Ar) or under vacuum. The elevated temperature may range from 300 to 550° C. in the pyrolysis process. For example, in one or more embodiments the waste plastic material is carbonized at an elevated temperature ranging from a lower limit of one of 300, 325, 350, 375, 400, and 425° C. to an upper limit of one of 425, 450, 475, 500, 525, and 550° C., where any lower limit may be paired with any mathematically compatible upper limit.

As described above, the waste plastic material may be heated at the elevated temperature for a sufficient amount of time to achieve carbonization. In one or more embodiments, the waste plastic material may be heated for an amount of time ranging from about 10 to about 60 minutes. For example, carbonization of the waste plastic material may take an amount of time ranging from a lower limit of one of 10, 15, 20, 35, 30, and 35 minutes to an upper limit of one of 40, 45, 50, 55, and 60 minutes, where any lower limit may be paired with any mathematically compatible upper limit. Additionally, in one or more embodiments, the waste plastic material is carbonized in an inert atmosphere, such as for example, under nitrogen or argon, or under vacuum.

Carbonization of the waste plastic material may be confirmed using analytical methods known in the art. Analytical spectroscopic methods such as Raman spectroscopy, 1H NMR spectroscopy, 13C NMR spectroscopy, infrared (IR) spectroscopy, among others, may be used to characterize the carbonized waste plastic material and confirm the chemical structure.

The carbonized waste plastic material may be further processed to provide a powder. In one or more embodiments, the waste plastic is processed by ball mill grinding. In such embodiments, a grinding medium (e.g., Netzsch, 0.45 mm Zirconia, ZetaBeads® Plus 0.4) and a lubricant such as glycol, ethanol or water, may be used in a ball mill (e.g., Netzsch Minicer). Other suitable grinding media include, but are not limited to, zirconia, tungsten carbide, silicon carbide, alumina, and steel balls. The grinding media may have an average diameter that is larger than that of the powder prepared by the grinding. For example, the particles of the grinding media may have a diameter on the millimeter or submillimeter scale. The powder may include particles having an average particle size in the micrometer range. As such, the powder may also be referred to herein as "carbon microparticles." The method 100 includes further grinding the particles of the powder to provide carbon microparticles. Carbon microparticles disclosed herein may have an average particle size of about 5.0 to about 20 μm. The size of particles can be measured by scanning electron microscope (SEM), transmission electron microscope (TEM), or by dynamic light scattering (DLS) method. For example, in one or more embodiments, the carbon microparticles may have an average particles size ranging from a lower limit of one of 5.0, 7.0, 10, and 12 μm to an upper limit of one of 12, 15, 17, and 20 μm, where any lower limit may be paired with any mathematically compatible upper limit. In some embodiments, the carbon microparticles have an average particle size of about 10 μm.

After carbonizing the waste plastic material in method 100, the resultant carbon microparticles may be functionalized 104. Functionalizing the carbon microparticles may provide a hydrophilic functionality on the surface of the microparticles. Such hydrophilic surface functionality may exhibit strong hydrogen bonding ability. Suitable hydrophilic surface functionalities include sulfonates. The functionalization of the carbon microparticles may be carried out using $SO_3$-containing gas. The functionalization process includes flowing a $SO_3$-containing gas over the carbon microparticles such that the $SO_3$ binds to the surface of the particles. The $SO_3$-containing gas may also include $N_2$ gas. The ratio of $SO_3$ to $N_2$ may be in a range of about 5:95 $SO_3$ to $N_2$ up 100% $SO_3$. For example, in one or more embodiments, the ratio of $SO_3$ to $N_2$ may be 5:95, 10:90, 20:80. 40:60, 50:50, 70:30, 90:10, or 100% $SO_3$. The $SO_3$-containing gas may be supplied at a flow rate and for a period of time sufficient to achieve desired surface functionalization. The flow rate may range from 0.1 milliliter per minute (mL/min) to 1 mL/min. The carbon microparticles may be stirred with a magnetic stirring bar or using an overhead mixer during the functionalization process.

In one or more embodiments, the carbon microparticles are combined with $SO_3$-containing gas at an elevated temperature for an amount of time in order to provide the hydrophilic surface functionality. The elevated temperature may range from about 30 to 70° C. For example, in one or more embodiments, functionalization of the carbon microparticles is carried out at an elevated temperature ranging from a lower limit of one of 30° C., 40° C., and 50° C. to an upper limit of one of 50° C., 60° C., and 70° C., where any lower limit may be paired with any mathematically compatible upper limit.

The carbon microparticles may be combined with $SO_3$-containing gas at such elevated temperature and maintained for a time to provide fully functionalized carbon microparticles. In other words, the functionalization mixture may be maintained for an amount of time such that the entire surface of the resultant carbon microparticles includes a hydrophilic surface functionality. As such, the functionalization may take from 5 to 30 minutes to provide fully functionalized carbon microparticles. For example, in one or more embodiments, the carbon microparticles may be in contact with a functionalizing agent for an amount of time ranging from a lower limit of one of 5, 10, 11, 12, 13, 15 and 15 minutes to an upper limit of one of 30 minutes, where any lower limit may be paired with a mathematically compatible upper limit.

During functionalization, $SO_3$-containing gas may be released as exhaust gas. The exhaust gas may require neutralization. Neutralization of the exhaust gas may occur through bubbling the exhaust gas into a base. The base may be any strong base capable of neutralization. In one or more embodiments, the base is NaOH. The base solution may be an aqueous solution. The aqueous solution may be at a concentration of 0.1 to 10 M. For example, in one or more embodiments, the aqueous solution may have a base concentration ranging from a lower limit of 0.1, 0.5, 1, 2, and 5 M to an upper limit of one of 5, 6, 7, 8, 9, and 10 M, where any lower limit may be paired with a mathematically compatible upper limit.

After the surface functionalization, original hydrophobic carbon microparticles can be well-dispersed in water, implying homogeneous sulfonation of carbon surface. The sulfonated carbon surface can be confirmed by FTIR spectroscopy (Nicolet iS50R FTIR spectrometer) with new vibrational bands at 3450 cm$^{-1}$, 1625 cm$^{-1}$, 1385 cm$^{-1}$ and 1100 cm$^{-1}$ for the functionalized carbon microparticles in comparison with pristine carbon microparticles.

After the carbon microparticles are functionalized, method 100 includes further grinding the functionalized microparticles to provide carbon nanoparticles 106. In one or more embodiments, the carbon microparticles may be ground into nanoparticles using a ball mill. In such embodiments, a grinding medium (e.g., Netzsch, 0.2 mm Zirconia, ZetaBeads® Plus 0.2) and a lubricant (such as glycol, ethanol, or water) may be used in the ball mill (e.g., Netzsch Minicer). Suitable grinding media include, but are not limited to, zirconia, tungsten carbide, silicon carbide, alumina, and steel balls. The grinding media may have an average diameter that is larger than that of the carbon microparticles. For example, the particles of the grinding media may have a diameter on the submillimeter or micrometer scale. Suitable lubricants include, but are not limited to, propylene glycol, glycol, ethanol, water, and combinations thereof. In one or more embodiments, carbon microparticles are ground into nanoparticles using a MiniCer ball mill supplied by Netzsch, glycol as a lubricant, and 0.2 mm zirconia beads as a grinding media.

When a ball mill is used to grind the carbon microparticles, the microparticles may be ball milled at a sufficient milling speed for a suitable amount of time to provide carbon nanoparticles. The milling speed may be sufficient if it is in the range of about 2000 rpm to about 4000 rpm. For example, a sufficient milling speed may range from a lower limit of one of 2000, 2200, 2400, 2600, 2800, and 3000 rpm to an upper limit of one of 3000, 3200, 3400, 3600, 3800, and 4000 rpm, where any lower limit may be paired with any mathematically compatible upper limit. To provide carbon nanoparticles, the microparticles may be milled for an amount of time ranging from 1 to 5 hours. For example, in one or more embodiments, the functionalized carbon microparticles are milled for an amount of time ranging from a lower limit of one of 1.0, 1.5, 2.0, and 2.5 hours to an upper limit of one of 3.0, 3.5, 4.0, 4.5, and 5.0 hours, where any lower limit may be paired with any mathematically compatible upper limit.

Figure 2:
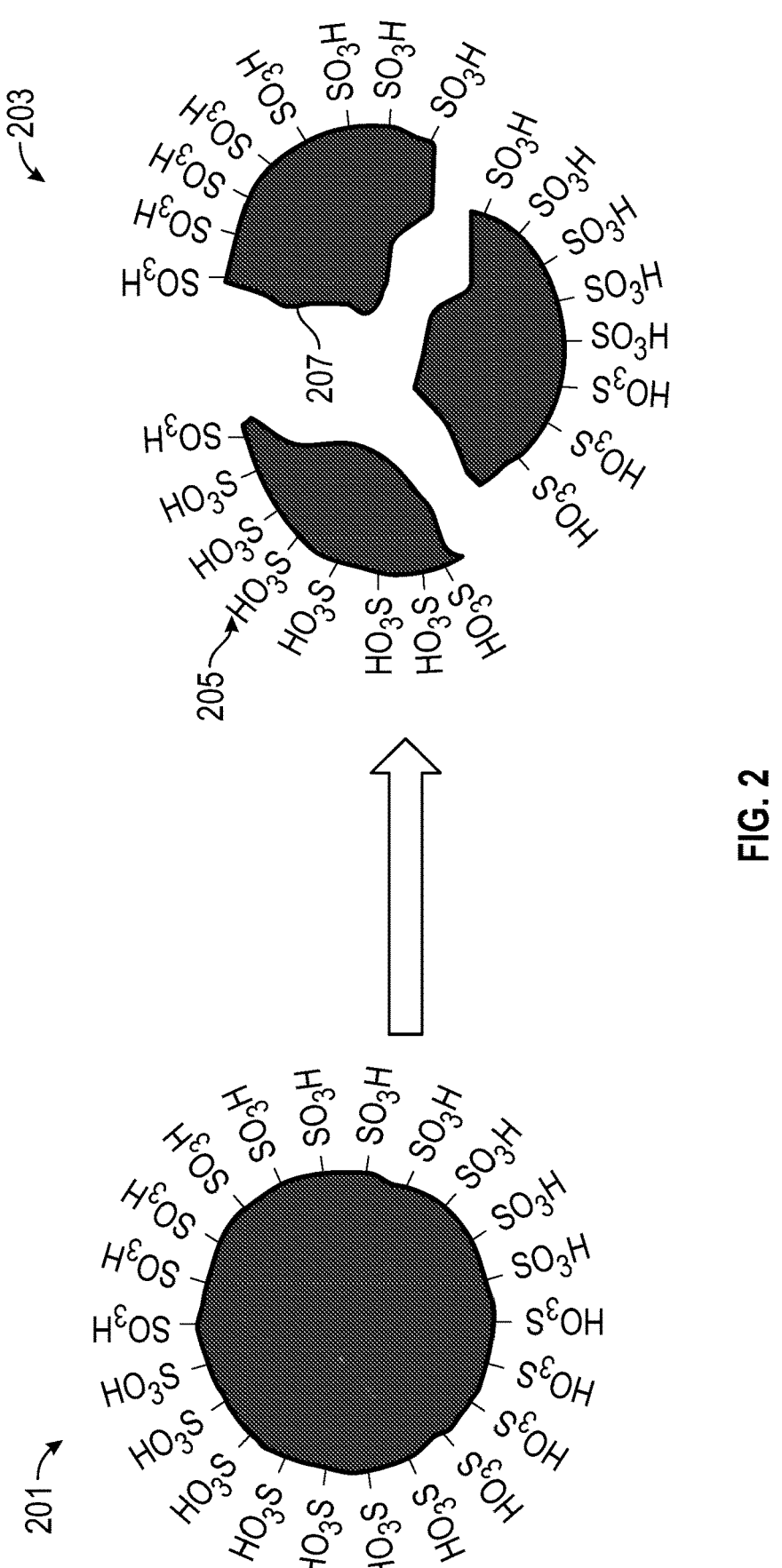
FIG. 2 is a schematic illustration of a carbon particle before and after grinding in accordance with one or more embodiments of the present disclosure.

As described above, grinding the functionalized carbon microparticles may provide carbon nanoparticles. In particular, the carbon nanoparticles are provided by breaking up the carbon microparticles into smaller, nanosized particles with asymmetric surface functionalization. As the Janus carbon nanoparticles are broken pieces of the carbon microparticles, they may have a hydrophilic surface, originating from the hydrophilic surface of the carbon microparticles, and a hydrophobic surface, originating from the core of the carbon microparticles, which is composed of amorphous carbon. A schematic depiction of such process and the resultant carbon nanoparticles is shown in FIG. 2. As shown in FIG. 2, a functionalized carbon microparticle 201 may be processed to provide Janus carbon nanoparticles 203 having a hydrophilic surface 205 and a hydrophobic surface 207. In one or more embodiments, the hydrophilic surface of the carbon nanoparticles includes a hydrophilic functionality that is the same as the hydrophilic functionality of the carbon microparticles. On the other hand, the hydrophobic surface of the carbon nanoparticles may be comprised primarily of carbon. The hydrophobic surface may be non-sulfonated. Ball milling the functionalized carbon microparticle 201 may generate the hydrophobic surface.

In one or more embodiments, the carbon nanoparticles have an average particle size ranging from about 5 to 500 nm, as measured by scanning electron microscope (SEM). For example, carbon nanoparticles prepared according to the disclosed method may have an average particle size ranging from a lower limit of one of 5, 10, 50, and 100 nm to an upper limit of one of 100, 200, 300, 400, and 500 nm, where any lower limit may be paired with any mathematically compatible upper limit.

As described above, Janus carbon nanoparticles in accordance with the present disclosure have a hydrophilic surface and a hydrophobic surface. As such, the disclosed carbon nanoparticles may have unique properties, such as surfactant-like surface properties. For example, as characterized according to Langmuir isotherm, the present carbon nanoparticles may exhibit an adsorption similar to that of conventional surfactants. Surfactants are widely used in enhanced oil recovery for their dual hydrophobic and hydrophilic nature. Accordingly, carbon nanoparticles of one or more embodiments may be beneficial to EOR processes when incorporated in EOR fluid compositions.

EOR Nanofluid Composition

In another aspect, embodiments disclosed herein relate to a composition for enhanced oil recovery. The EOR nanofluid may include a nanomaterial and an aqueous-based fluid.

In one or more embodiments, the EOR nanofluid includes carbon nanoparticles. The carbon nanoparticles may be prepared according to the method described above. Accordingly, the Janus carbon nanoparticles are as previously described.

The EOR nanofluid may include the Janus carbon nanoparticles in an amount ranging from about 0.01 wt % to about 3.0 wt %. For example, in one or more embodiments, Janus carbon microparticles are present in the EOR nanofluid in an amount ranging from a lower limit of one of 0.01, 0.05, 0.1, 0.5, and 1.0 wt % to an upper limit of one of 1.0, 1.5, 2.0, 2.5, and 3.0 wt %, where any lower limit may be paired with any mathematically compatible upper limit.

In one or more embodiments, the EOR nanofluid includes an aqueous-based fluid. The aqueous-based fluid includes water. The water may be distilled water, deionized water, tap water, fresh water from surface or subsurface sources, production water, formation water, natural and synthetic brines, brackish water, natural and synthetic sea water, black water, brown water, gray water, blue water, potable water, non-potable water, other waters, and combinations thereof, that are suitable for use in a wellbore environment. In one or more embodiments, the water used may naturally contain contaminants, such as salts, ions, minerals, organics, and combinations thereof, as long as the contaminants do not interfere with the operation of the drilling fluid.

In one or more embodiments, the EOR nanofluid includes water in a range of from about 97 wt % to 99.9 wt % based on the total weight of the EOR fluid.

In one or more embodiments, the water used for the EOR composition may have an elevated level of salts or ions versus fresh water, such as salts or ions naturally present in formation water, production water, seawater, and brines.

Increasing the saturation of water by increasing the salt concentration or other organic compound concentration in the water may increase the density of the water, and thus, the EOR fluid. Suitable salts may include, but are not limited to, alkali metal halides, such as chlorides, hydroxides, or carboxylates. In one or more embodiments, salts included as part of the aqueous-based fluid may include salts that disassociate into ions of sodium, calcium, cesium, zinc, aluminum, magnesium, potassium, strontium, silicon, lithium, chlorides, bromides, carbonates, iodides, chlorates, bromates, formates, nitrates, sulfates, phosphates, oxides, and fluorides, and combinations thereof.

In one or more embodiments, the EOR fluid includes one or more salts in an amount that ranges from about 0 to about 225,000 ppm (parts per million) in TDS (total dissolved solids). For example, the EOR fluid may contain the one or more salts in an amount ranging from a lower limit of any of 0, 5,000, 10,000, 20,000, 30,000, 50,000, 75,000, 100,000 and 125,000 ppm to an upper limit of any of 125,000, 150,000, 175,000, 200,000, and 225,000 ppm, where any lower limit can be used in combination with any mathematically compatible upper limit.

In one or more embodiments, the EOR fluid includes one or more additives. Any additives known in the art for EOR nanofluids may be used. Examples of such additives include but are not limited to surfactants, stabilizers, and/or mixtures thereof. In one or more embodiments, additives may be included in the EOR fluid in an amount ranging from 0 to about 3 wt %.

In one or more embodiments, the EOR nanofluid may be characterized according to several properties, such as, for example, viscosity, density, and homogeneity. Further, the presence of the carbon nanoparticles in the fluid may result in a decreased interfacial tension between the EOR fluid and the oil within a reservoir.

Method of EOR

In yet another aspect, embodiments of the present disclosure relate to a method of enhanced oil recovery using an enhanced oil recovery fluid composition described above. The method may include introducing an enhanced oil recovery fluid into a hydrocarbon-bearing formation, displacing hydrocarbons from the hydrocarbon-bearing formation, and recovering the hydrocarbons.

Figure 3:
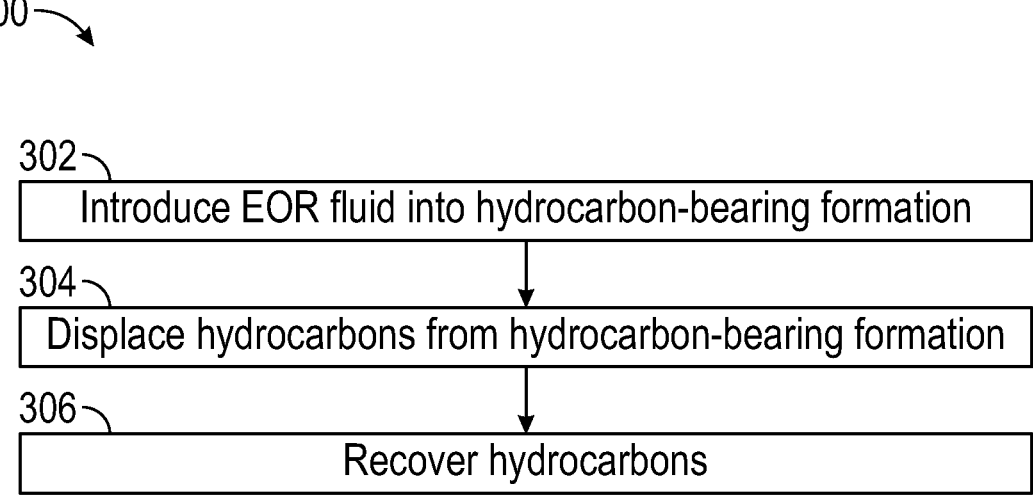
FIG. 3 is a block-flow diagram of a method in accordance with one or more embodiments of the present disclosure.

A method, 300, in accordance with the present disclosure is shown in, and discussed with reference to, FIG. 3. Initially, in method 300, an enhanced oil recovery fluid is introduced into a hydrocarbon-bearing formation 302. The EOR nanofluid is as previously described. The hydrocarbon-bearing formation may include oil. In one or more embodiments, the hydrocarbon-bearing reservoir has already been depleted of about a third of its hydrocarbon content. The EOR nanofluid may be introduced into the hydrocarbon-bearing formation using pipes and tubing known in the art. For example, a chemical injection skid may be used to introduce the EOR nanofluid into the hydrocarbon-bearing formation.

Then, in method 300, the hydrocarbon is displaced from the hydrocarbon-bearing formation 304. The hydrocarbon may be displaced using the disclosed EOR nanofluid. In one or more embodiments, the Janus carbon nanoparticles may have a surfactant-like surface property in the EOR nanofluid. Accordingly, disclosed Janus carbon nanoparticles may reside at the oil-water interface or at the rock-fluid interface downhole, and thus may increase the hydrocarbon mobility or alter the wettability of reservoir rock, resulting in increased hydrocarbon displacement.

Finally, in method 300, the hydrocarbons may be recovered 306. As described above, in the presence of the disclosed EOR nanofluid, the hydrocarbons may have an increased mobility and thus an increased hydrocarbon recovery from the formation. Method 300 may result in greater recovery of oil initially in place (OIIP).

Embodiments of the present disclosure may provide at least one of the following advantages. Current methods known in the art for sulfonation tend to use acid treatments for functionalization. The acids may be $H_2SO_4$ and $HNO_3$. Methods using acids tend to produce an excessive amount of liquid waste. Additionally, methods using acids tend to require filtration procedures to separate the functionalized material from the acids. In contrast, methods using $SO_3$-containing gas, as described herein, do not produce any liquid waste. Further, methods using $SO_3$-containing gas do not require any filtration procedures after functionalization.

EXAMPLES

Waste plastic water bottles (polymer PET) were cut into small pieces in millimeter size, and 5 grams of the plastic fragments were put into a crucible. After heating at 450° C. for 30 minutes under $N_2$ atmosphere, the resulting carbon black powder was collected. By grinding in an agate mortar, the carbon powder was easily broken down to size in micrometer range, i.e., carbon microparticles.

Figure 4B:
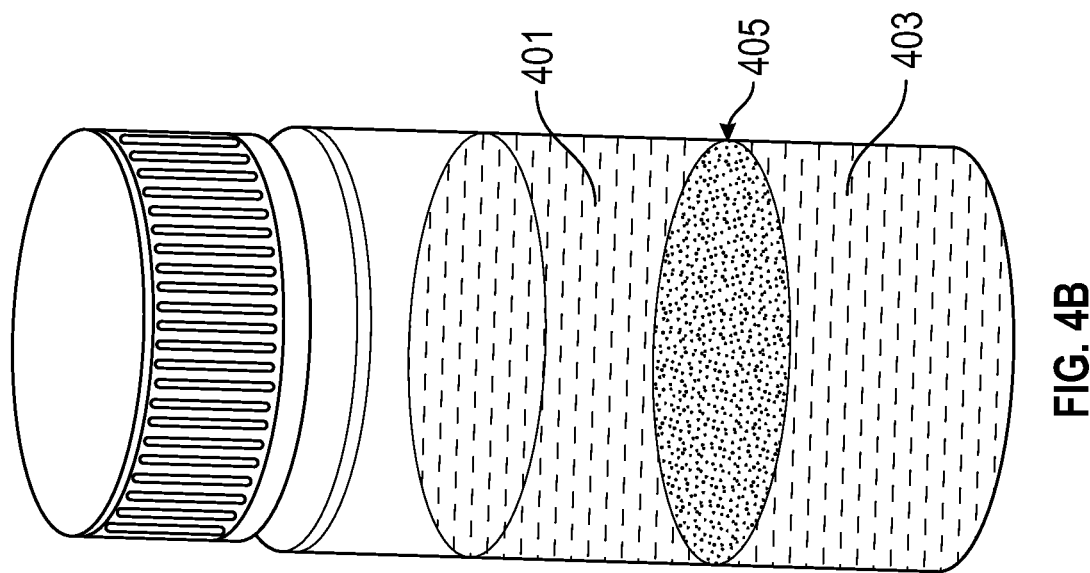
FIGS. 4A and 4B are images of solvent mixtures including carbon nanoparticles in accordance with one or more embodiments of the present disclosure.
Figure 4A:
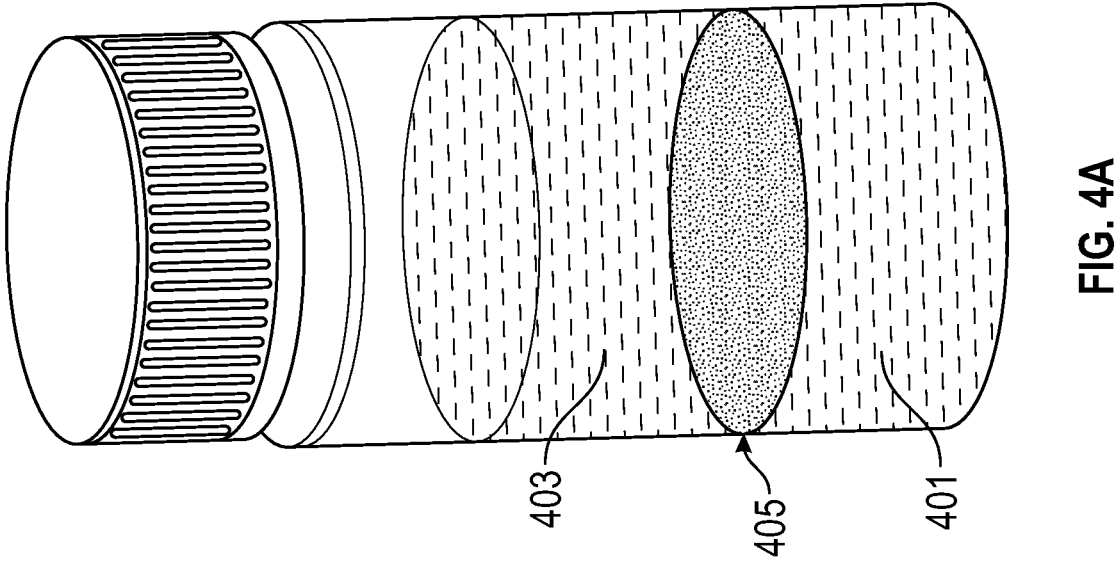

The carbon structure was confirmed by Raman spectroscopy with characteristic D-band at around 1365 cm$^{-1}$ and G-band at around 1605 cm$^{-1}$ (FIG. 4, "C-MPs"). The spectrum was recorded with a Horiba-Revolution Raman spectrophotometer at an excitation wavelength of 532 nm.

Carbon microparticles were placed in a flask (2 grams) and the temperature was maintained at 50° C. $SO_3$ gas along with $N_2$ gas was then introduced into the flask at 0.1 mL/min (50/50 ratio of each gas) while the carbon microparticles were mixed using external overhead mixer. Exhaust gas was neutralized in a base bath through bubbling into aqueous NaOH. Then the reaction stayed to run for 15 minutes, and the carbon microparticles were washed, filtered, and dried.

A laboratory-use ball mill (Netzsch, MiniCer) was used for grinding the carbon microparticles. Quantity equivalent of 140 mL of zirconia beads (diameter of 0.45 mm) were first loaded into the mill chamber as the grinding medium. Then, 10 grams of functionalized carbon microparticles were mixed with 200 mL of water in an open mixing vessel and pumped to flow through the milling chamber. The milling speed was set at 3000 rpm and the feed material fluids circulated in the milling chamber at a rate of 100 mL/min. After 2 hours of milling, the fluids were collected, and resultant carbon nanoparticles were separated by centrifuge and washed with ethanol.

The synthesized Janus carbon nanoparticles were dispersed in a mixture of water 401 and organic solvent 403. The organic solvent 403 is hexanol in FIG. 4A and chloroform in FIG. 4B. Upon the phase separation, FIGS. 4A and 4B demonstrate that the carbon nanoparticles 405 self-assembled at the interface of water 401 and organic solvent 403, indicating their dual surface properties (i.e., hydrophobic and hydrophilic).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed:

1. A method of preparing an enhanced oil recovery composition comprising:

carbonizing a waste plastic material to provide carbon microparticles;

functionalizing the carbon microparticles with an $SO_3$-containing gas such that the carbon microparticles comprise a hydrophilic surface, wherein functionalizing the carbon microparticles with the $SO_3$-containing gas comprises heating the carbon microparticles at a temperature from about 30 to 70° C. at a flow rate from 0.1 milliliter per minute (mL/min) to 1 ml/min; and grinding the carbon microparticles to provide carbon nanoparticles, wherein the carbon nanoparticles comprise a hydrophilic surface and a hydrophobic surface.

2. The method of claim 1, wherein carbonizing a waste plastic material further comprises grinding to provide carbon microparticles.

3. The method of claim 1, further comprising mixing the carbon nanoparticles with an aqueous-based fluid to provide an enhanced oil recovery fluid.

4. The method of claim 1, wherein the waste plastic material comprises a polymer selected from the group consisting of polypropylene (PP), polystyrene (PS), acrylonitrile butadiene styrene (ABS), polyethylene terephthalate (PET), polyester (PES), polyamide (PA), polyvinyl chloride (PVC), polyurethane (PU), polycarbonate (PC), polyvinylidene chloride (PVDC), polyethylene (PE), and combinations thereof.

5. The method of claim 1, wherein the waste plastic material is a plastic waste bottle.

6. The method of claim 1, wherein carbonizing the waste plastic material comprises heating the waste plastic material at a temperature of a range of 300 to 550° C.

7. The method of claim 1, wherein the carbon microparticles have an average particle size ranging 5 to 20 μm.

8. The method of claim 1, wherein functionalizing the carbon microparticles with the $SO_3$-containing gas comprises heating the carbon microparticles at a temperature of 50° C. at a flow rate of 0.1 mL/min.

9. The method of claim 8, wherein functionalizing the carbon microparticles with the $SO_3$-containing gas further comprises heating for 15 minutes.

10. The method of claim 1, wherein the hydrophilic surface functionality is a sulfonate.

11. The method of claim 1, wherein grinding the carbon microparticles comprises ball milling the carbon microparticles for an amount of time from 0.5 to 8 hours with a speed of 2000 to 4000 rpm.

12. The method of claim 1, wherein the carbon nanoparticles have an average particle size ranging from 5 to 500 nm.

13. The method of claim 1, wherein the hydrophobic surface is a non-sulfonated carbon surface.

14. The method of claim 11, wherein the hydrophobic surface is generated by ball milling.

15. The method of claim 3, wherein the aqueous-based fluid is water, seawater, or brine.

16. The method of claim 3, wherein the aqueous-based fluid comprises one or more additives selected from the group consisting of surfactant, stabilizers, and combinations thereof.

* * * * *